US010833918B2

(12) United States Patent
Shang

(10) Patent No.: US 10,833,918 B2
(45) Date of Patent: Nov. 10, 2020

(54) AUTOMATIC RULE BASED GROUPING OF COMPUTE NODES FOR A GLOBALLY OPTIMAL CLUSTER

(71) Applicant: VMWARE, INC., Palo Alto, CA (US)

(72) Inventor: Jingliang Shang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 93 days.

(21) Appl. No.: 16/281,128

(22) Filed: Feb. 21, 2019

(65) Prior Publication Data

US 2020/0220771 A1 Jul. 9, 2020

(30) Foreign Application Priority Data

Jan. 9, 2019 (WO) ................ PCT/CN2019/070964

(51) Int. Cl.
*H04L 12/24* (2006.01)
*H04L 12/26* (2006.01)

(52) U.S. Cl.
CPC ...... *H04L 41/0654* (2013.01); *H04L 41/0803* (2013.01); *H04L 43/10* (2013.01)

(58) Field of Classification Search
CPC . H04L 41/0654; H04L 41/0803; H04L 43/10; H04L 41/08; H04L 41/0806; H04L 41/0823–0836; H04L 41/0886; H04L 41/0893; G06F 11/07; G06F 11/0709; G06F 11/2023–2033
See application file for complete search history.

(56) References Cited

U.S. PATENT DOCUMENTS 6,732,166 B1 * 5/2004 Woodruff ............ H04L 67/1097 709/221
2006/0190775 A1 * 8/2006 Aggarwal ........... H04L 41/0816 714/100
2011/0055364 A1 * 3/2011 Heim .................. H04L 41/0846 709/223

(Continued)

FOREIGN PATENT DOCUMENTS

CN 107404522 A * 11/2017

OTHER PUBLICATIONS

"Abstract CN 107404522 A" East 2017 (Year: 2017).*

(Continued)

*Primary Examiner* — Maharishi V Khirodhar
*Assistant Examiner* — Kenneth P Hunt

(57) ABSTRACT

Techniques for automatic rule based grouping of compute nodes for a global optimal cluster are disclosed. In one embodiment, a virtual infrastructure management (VIM) server may obtain a list of operating, provisioned and/or about to be provisioned compute nodes in a cluster. The VIM server may then obtain user configured and run-time network parameters of a network interface card (NIC) of each compute node in the list. Further, the VIM server may then measure round-trip times (RTTs), using a ping, between each compute node and each of remaining compute nodes in the list. Furthermore, the VIM server may then group the compute nodes in the list based on the obtained user configured and run-time network parameters and/or the measured RTTs. In addition, the VIM server may perform a high availability (HA) operation in the cluster using the grouped compute nodes.

26 Claims, 3 Drawing Sheets

OBTAIN A LIST OF OPERATING, PROVISIONED AND/ OR ABOUT TO BE PROVISIONED COMPUTE NODES IN A CLUSTER — 202

OBTAIN NETWORK PARAMETERS OF A NETWORK INTERFACE CARD (NIC) OF EACH COMPUTE NODE IN THE LIST — 204

MEASURE ROUND-TRIP TIMES (RTTs), USING A PING, BETWEEN EACH COMPUTE NODE AND EACH OF REMAINING COMPUTE NODES IN THE LIST — 206

GROUP THE COMPUTE NODES IN THE LIST BASED ON THE OBTAINED NETWORK PARAMETERS AND/OR THE MEASURED RTTs — 208

PERFORM AN HIGH AVAILABILITY (HA) OPERATION IN THE CLUSTER USING THE GROUPED COMPUTE NODES — 210

(56) References Cited

U.S. PATENT DOCUMENTS

| | | | | |
|---|---|---|---|---|
| 2015/0347167 | A1* | 12/2015 | Bonazzola | G06F 9/45558 718/1 |
| 2018/0101395 | A1* | 4/2018 | Aleksandrov | G06F 9/5077 |
| 2019/0087234 | A1* | 3/2019 | Wu | G06F 9/455 |
| 2019/0327147 | A1* | 10/2019 | Killadi | H04L 41/0668 |
| 2020/0125662 | A1* | 4/2020 | Zhu | G06F 9/542 |

OTHER PUBLICATIONS

"English Translation CN 107404522 A" Google Patents 2020 https://patents.google.com/patent/CN107404522A/en?oq=CN+107404522A (Year: 2020).*

* cited by examiner

AUTOMATIC RULE BASED GROUPING OF COMPUTE NODES FOR A GLOBALLY OPTIMAL CLUSTER

RELATED APPLICATIONS

Benefit is claimed under 35 U.S.C. 119(a)-(d) to Foreign Application Serial No. PCT/CN2019/070964 filed in PCT entitled "AUTOMATIC RULE BASED GROUPING OF COMPUTE NODES FOR A GLOBALLY OPTIMAL CLUSTER", on Jan. 9, 2019, by VMware Information Technology (China) Co., Ltd. et al. which is herein incorporated in its entirety by reference for all purposes.

TECHNICAL FIELD

The present disclosure relates to stretched cluster environments, and more particularly to methods, techniques, and systems for automatic grouping of compute nodes for a globally optimal stretched cluster relating to fault recovery and high availability in the cloud environments.

BACKGROUND

A primary consideration for the architecture of a virtual datacenter is how to best maximize the availability of the services provided by the virtual machines. Availability solutions are designed to improve the resiliency of local systems or entire sites and fall broadly into the categories of downtime avoidance and fault recovery. Fault recovery solutions include high availability and disaster recovery. High availability (HA) is an automated failover solution, typically within a single datacenter, that responds to unplanned outages and restarts virtual machines as appropriate. For example, if a virtual machine fails on one host device, HA may respond by restarting the virtual machine on another host device. Disaster recovery is a manual process for recovering all or a portion of a datacenter at a recovery site from replicated data. For example, a disaster recovery tool alerts an administrator of a possible site failure. The administrator may then provide input to the disaster recovery tool to initiate recovery of all or a portion of the inventory of virtual machines within the protected datacenter.

Recently, HA has been applied to clusters of devices that span datacenter sites. These "stretched clusters' offer the ability to balance workloads between two or more datacenters, enabling migration of services between geographically close sites without sustaining an outage. Stretched clusters add benefits to site-level availability and downtime avoidance but introduce considerable complexity at the network and storage layers, as well as demanding rigorous operational management and change control. A cluster depends upon a single (logical) storage subsystem and single virtualization management server. As a result, the stretched cluster does not provide fault tolerance operation for the virtualization management server. A stretched cluster expands upon the functionality of a cluster by enabling devices within multiple locations to be a part of a single cluster. For example, disk writes are committed synchronously at both locations to ensure that data is consistent, regardless of the location from which it is being read. The stretched cluster replication model, however, does not support asynchronous replication and requires significant bandwidth and very low latency between the sites involved in the cluster. As a result, stretched cluster sites are kept within a limited geographic range, e.g., within 100 kilometers or 5 microseconds round-trip time latency. Additionally, should a portion of the virtual environment fail, current implementations of HA are not designed for complex disaster recovery scenarios in which virtual machines start in a sequence. For example, current implementations of HA are unable to handle alternate workflows or handle different scenarios for failure. Current implementations of HA also do not provide geographically distant multisite recovery.

Disaster recovery tools enable complex recovery scenarios while providing site and virtualization management server fault tolerance. Current implementations of HA restrict the ability to use disaster recovery tools, because HA is dependent upon a single virtualization management server and disaster recovery tools are dependent upon multiple virtualization management servers.

The drawings described herein are for illustration purposes only and are not intended to limit the scope of the present subject matter in any way.

DETAILED DESCRIPTION

Embodiments described herein may provide an enhanced computer-based and network-based method, technique, and system for automatic rule based grouping of compute nodes for a globally optimal cluster. A cluster is a collection of resources (such as nodes, disks, adapters, databases, etc.) that collectively provide scalable services to end users and to their applications while maintaining a consistent, uniform, and single system view of the cluster services. By design, a cluster is supposed to provide a single point of control for cluster administrators and at the same time the cluster is supposed to facilitate addition, removal, or replacement of individual resources without significantly affecting the services provided by the entire system. On one side, a cluster has a set of distributed, heterogeneous physical resources and, on the other side, the cluster projects a seamless set of services that are supposed to have a look and feel (in terms of scheduling, fault tolerance, etc.) of services provided by a single large virtual resource. Obviously, this implies some form of continuous coordination and mapping of the physical distributed resources and their services onto a set of virtual resources and their services. In public and private clouds there can be several thousand compute nodes in one cluster and the compute nodes, in such a scenario, may need to be configured and grouped by location. Doing such configuration manually can be very tedious, impractical and unreliable. Further, it may be difficult to locate the physical location of a compute node that is located remotely. Any mistake in configuration of the compute nodes can seriously impact the datacentre and/or public/private cloud operation and may significantly increase down-time.

Example cluster may be a stretched cluster, a multi-AZ cluster, a metro cluster, or a high availability (HA) cluster that crosses multiple areas within a local area network (LAN), a wide area network (WAN) or the like. Automatically grouping (i.e., automatically detecting, formatting and configuring) the compute nodes in a cluster may assist in enhancing fault recovery scenarios, i.e., in scenarios such as, load balancing between or within metro cities and HA. Without grouping the compute nodes in a cluster, if any of the compute nodes running applications fail, the application may not be available until the failure is fixed. However, rule based grouping of the compute nodes in a cluster can overcome such a failure by detecting hardware/software failures and may failover the application on another compute node without requiring any administrative intervention.

System Overview and Examples of Operation

Figure 1:
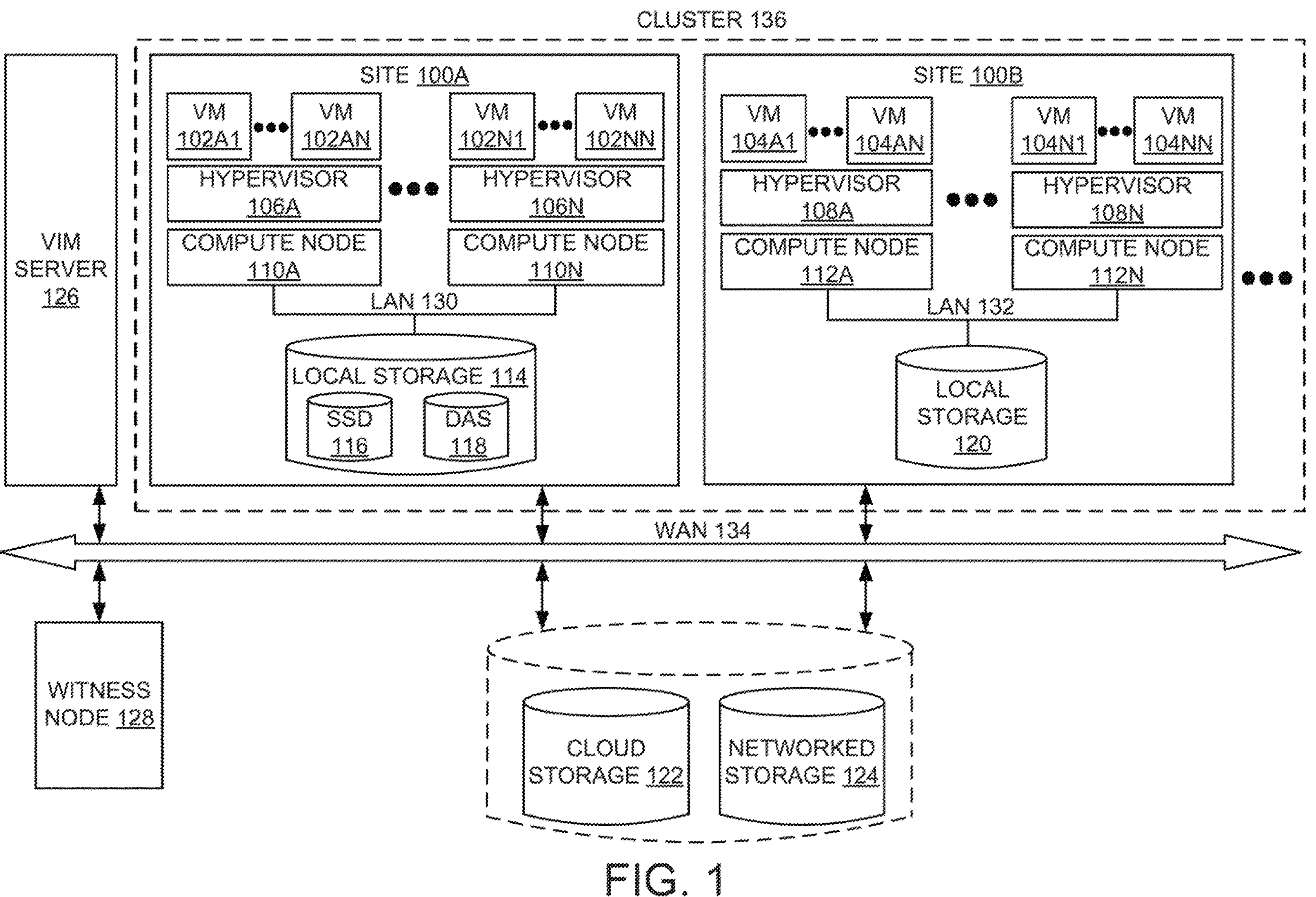
FIG. 1 depicts a block diagram of a computing system in which one or more embodiments of the present invention may be implemented.

FIG. 1 is a system view of an example block diagram of a computing system 100 illustrating a cloud storage 122, a networked storage 124, a virtual infrastructure management (VIM) server 126, a witness node 128, and a cluster 136 communicatively connected via a wide area network (WAN) 134 for automatic ruled based grouping of compute nodes for a globally optimal cluster. Example cluster may be a stretched cluster, a multi-AZ cluster, a metro cluster, or a high availability (HA) cluster that crosses multiple areas within local area networks (LANs) 130 and 132, the WAN 134 or the like. As shown in FIG. 1, cluster 136 may include one or more sites 100A-N. Each site may include multiple compute nodes 110A-N. Each of compute nodes 110A-N may refer to a computing device or computer program (i.e., executing on a computing device) that requests services from VIM server 126. Example compute nodes 110A-N and 112A-N may include, but not limited to, physical computing devices, virtual machines, containers, or the like. One or more virtual machines (VMs) 102A-N, in some embodiments, may operate on each of compute nodes 110A-N via respective hypervisors 106A-N.

Further as shown in FIG. 1, computing system 100 includes a local storage 114 that is communicatively coupled to the compute nodes 110A-N. Local storage 114 may include a solid state drive (SSD) 116 and a direct access storage (DAS) 116. Local storage may also include a persistent memory (PMem) disk. Furthermore, as shown in FIG. 1, computing system 100 includes a local storage 120 coupled to compute nodes 112A-N via LAN 132.

In operation, VIM server 126 obtains a list of operating, provisioned and/or about to be provisioned compute nodes 110A-N and112A-N in cluster 136. Example cluster may include a stretched cluster, a multi-AZ cluster, a metro cluster, or a high availability (HA) cluster that crosses multiple areas within a local area network (LAN) or a wide area network (WAN). In some embodiments, VIM server 126 may obtain the list of operating, provisioned and/or about to be provisioned compute nodes in the cluster using a user input, an output of a provisioning tool and/or an output of a scaling tool that automatically deploys the compute nodes. Example output, in a public cloud automation framework, can be a user having a contract to use a cluster in the public cloud having about 100 compute nodes. In this scenario, the provisioning tool may need to bring up about 100 compute nodes and this can result in a list of about 100 compute nodes as output.

VIM server 126 may then obtain user configured and run-time network parameters of a network interface card (NIC) associated with each compute node in the list. Example user configured and run-time network parameters are internet protocol (IP) routing table, address resolution protocol (ARP) table, net neighbor table, MAC address, hardware physical address, IP address, subnet mask, default gateway, domain name system (DNS) server, host name, NIC port type, port speed and/or mapping tables.

VIM server 126 may then measure round-trip times (RTTs), using a ping, between each compute node and each of remaining compute nodes in the list. Example minimum RTT may be about 10 milliseconds. VIM server 126 may determine RTTs using a pre-determined number of pings, between each compute node and each of remaining compute nodes in the list. In these embodiments, VIM server 126 may obtain minimum RTTs using the measured RTTs that are obtained using the predetermined number of pings.

VIM server 126, may then group the compute nodes in the list based on the obtained user configured and run-time network parameters and/or the measured RTTs. The term "grouping" also refers to classifying, tagging, locating, configuring, and like. In some embodiments, VIM server 126 may group the compute nodes in the cluster based on whether a MAC address and/or hardware physical address is in one of the ARP table and address mapping table. Further in some embodiments, VIM server 126 may obtain location related data using the location devices, chipsets, hardware and/or sensors in each compute node in the list. In these embodiments, VIM server 126 may group the compute nodes in the list based on the obtained location related data, the obtained user configured and run-time network parameters, and/or the measured RTTs.

VIM server 126 may then perform a high availability (HA) operation in the cluster using the grouped compute nodes. Example HA operation is a load balancing operation, fault tolerance operation and/or disaster/fault recovery operation, and the like.

VIM server 126 may then configure one or more compute nodes, that are not grouped in the list, as witness compute nodes (e.g., witness node 128, shown in FIG. 1). VIM server 126 may then use the configured witness nodes to break ties and/or to resolve split-brain syndromes in the cluster during operation.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 2:
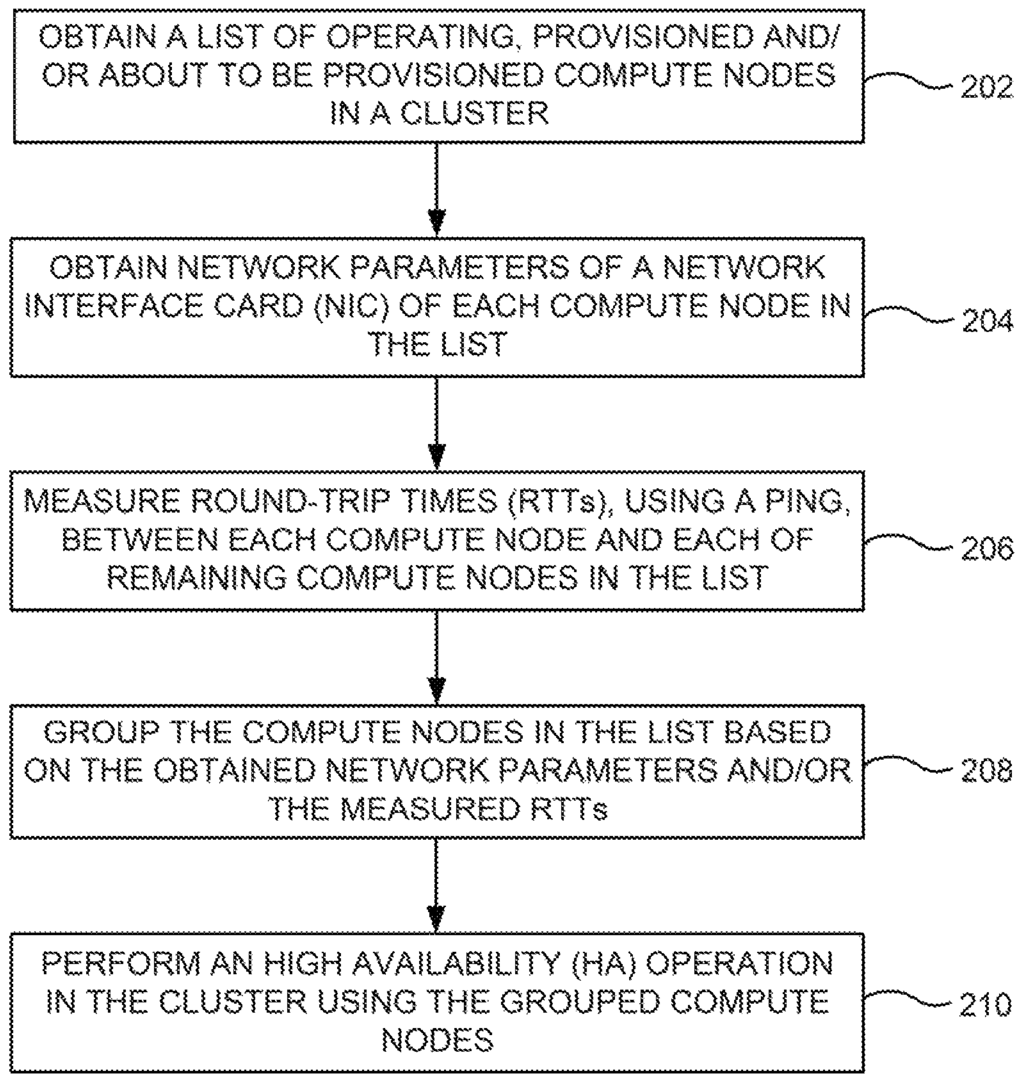
FIG. 2 depicts a flow diagram of a method of automatic ruled based grouping of compute nodes for a globally optimal cluster, according to an embodiment.

FIG. 2 is an example flow diagram 200 illustrating automated rule based grouping of compute nodes for a globally optimal cluster. It should be understood that the process depicted in FIG. 2 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 202, a list including operating, provisioned and/or about to be provisioned compute nodes in a cluster is obtained. Example cluster may include a stretched cluster, a multi-AZ cluster, a metro cluster, or a high availability (HA) cluster that crosses multiple areas within a local area network (LAN) or a wide area network (WAN). In some embodiments, the list of operating, provisioned and/or about to be provisioned compute nodes in the cluster may be obtained using a user input, an output of a provisioning tool and/or an output of a scaling tool that automatically deploys the compute nodes.

At 204, user configured and run-time network parameters of a network interface card (NIC) associated with each compute node in the list is obtained. Example user configured and run-time network parameters are internet protocol (IP) routing table, address resolution protocol (ARP) table, net neighbor table, MAC address, hardware physical address, IP address, subnet mask, default gateway, domain name system (DNS) server, host name, NIC port type, port speed and/or mapping tables.

At 206, round-trip times (RTTs), using a ping, between each compute node and each of remaining compute nodes in the list are measured. In some embodiments, a minimum RTT is about 10 milliseconds. Further in some embodiments, RTTs may be measured, using a pre-determined number of pings, between each compute node and each of remaining compute nodes in the list. In these embodiments, RTTs are determined between each compute node and each of remaining compute nodes in the list using the measured RTTs obtain At 208, the compute nodes in the list are grouped based on the obtained user configured and run-time network parameters and/or the measured RTTs. In some embodiments, the compute nodes in the cluster are grouped based on whether a MAC address and/or hardware physical address is in one of the ARP table and address mapping table. The term "grouping" also refers to classifying, tagging, locating, configuring, and like. Further in some embodiments, location related data is obtained using the location devices and/or sensors in each compute node in the list. In these embodiments, the compute nodes are grouped based on the obtained location related data, the obtained user configured and run-time network parameters, and/or the measured RTTs.

At 210, high availability (HA) operation in the cluster is performed using the grouped compute nodes. Example HA operation is a load balancing operation, fault tolerance operation and/or disaster/fault recovery operation, and the like.

In some embodiments, one or more compute nodes, that are not grouped in the list, may be configured as witness compute nodes. In these embodiments, the configured witness nodes may be used to break ties and/or to resolve split-brain syndromes in the cluster during operation.

Figure 3:
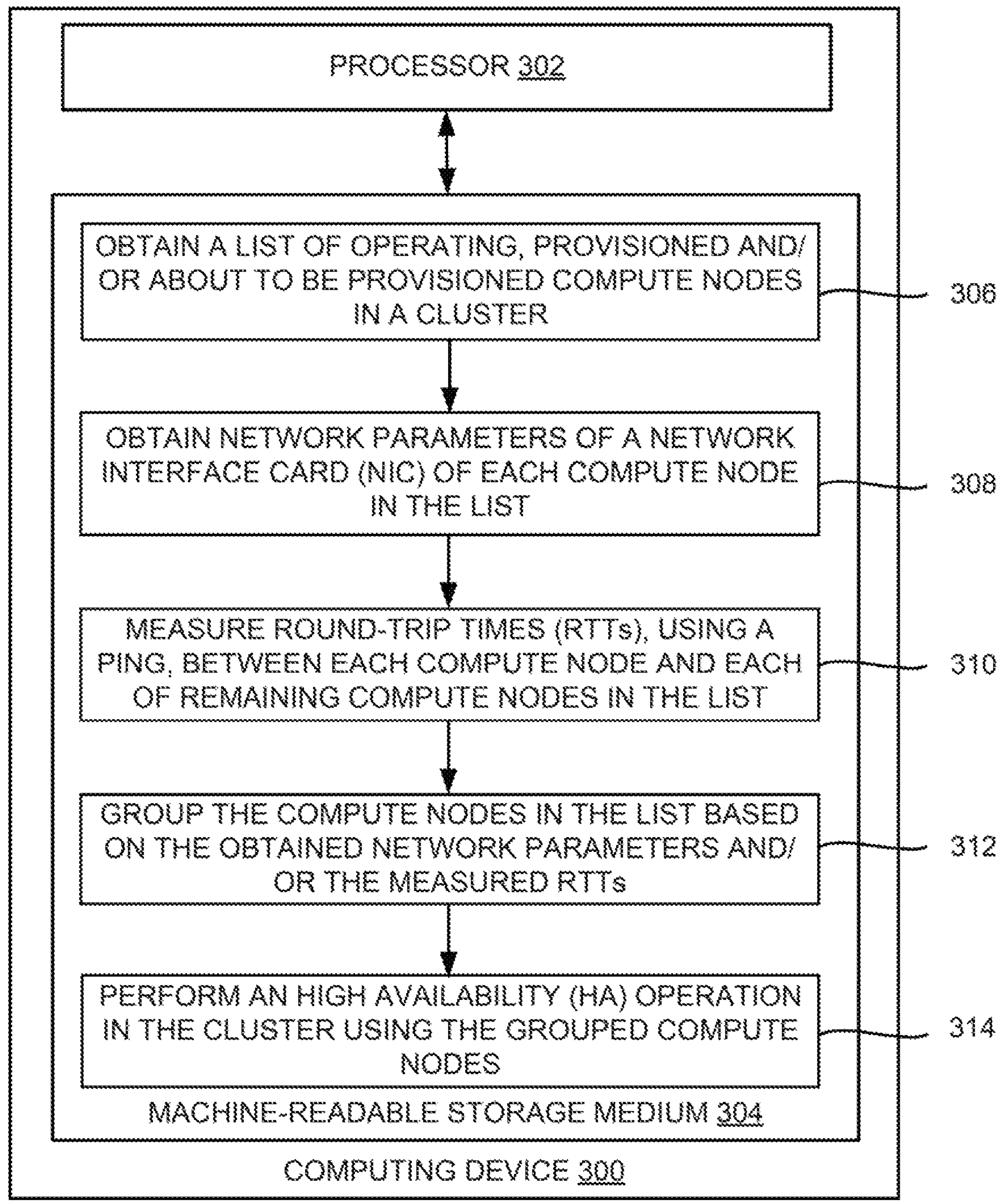
FIG. 3 is a block diagram of an example computing system including a non-transitory computer-readable storage medium, storing instructions to automatically group compute nodes for a globally optimal cluster.

FIG. 3 is a block diagram of an example computing device 300 including non-transitory computer-readable storage medium, storing instructions for automatic rule-based grouping of compute nodes for a globally optimal cluster. The computing device 300 may include a processor 302 and a machine-readable storage medium 304 communicatively coupled through a system bus. The processor 302 may be any type of central processing unit (CPU), microprocessor, or processing logic that interprets and executes machine-readable instructions stored in the machine-readable storage medium 304. The machine-readable storage medium 304 may be a random-access memory (RAM) or another type of dynamic storage device that may store information and machine-readable instructions that may be executed by the processor 302. For example, the machine-readable storage medium 304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 304 may be a non-transitory machine-readable medium. In an example, the machine-readable storage medium 304 may be remote but accessible to computing device 300.

The machine-readable storage medium 304 may store instructions 306-314. In an example, instructions 306-314 may be executed by processor 302 for monitoring the health of the application using historical application health data and application logs. Instructions 306 may be executed by processor 302 to obtain the list of operating, provisioned, and/or about to be provisioned compute nodes in a cluster. Instructions 308 may be executed by processor 302 to obtain user configured and run-time network parameters of a NIC of each compute node in the list. Instructions 310 may be executed by processor 302 to measure RTTS, using a ping, between each compute node and each of remaining compute nodes in the list. Instructions 312 may be executed by processor 302 to group the compute nodes in the list based on the obtained user configured and run-time network parameters and/or the measured RTTs. Further, instructions 314 may be executed by processor 302 to manage the HA in the cluster using the grouped compute nodes.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:

obtaining a list of operating, provisioned and/or about to be provisioned compute nodes in a cluster;

obtaining user configured and run-time network parameters of a network interface card (NIC) of each compute node in the list;

measuring round-trip times (RTTs), using a ping, between each compute node and each of remaining compute nodes in the list;

grouping the compute nodes in the list based on the obtained user configured and run-time network parameters and/or the measured RTTs; and performing a high availability (HA) operation in the cluster using the grouped compute nodes.

2. The method of claim 1, wherein the cluster comprises a stretched cluster, a multi-AZ cluster, a metro cluster, or a high availability (HA) cluster that crosses multiple areas within a local area network (LAN) or a wide area network (WAN).

3. The method of claim 1, further comprising:

determining presence of any location devices and/or sensors in each compute node in the list; and obtaining location related data using the location devices and/or sensors for each compute node in the list, wherein performing the HA operation in the cluster comprises:

grouping the compute nodes based on the obtained location related data, the obtained user configured and run-time network parameters, and/or the measured RTTs, and performing the HA availability operation in the cluster using the grouped compute nodes.

4. The method of claim 1, wherein the user configured and run-time network parameters are internet protocol (IP) routing table, address resolution protocol (ARP) table, net neighbor table, MAC address, hardware physical address, IP address, subnet mask, default gateway, domain name system (DNS) server, host name, NIC port type, port speed and/or mapping tables.

5. The method of claim 4, wherein grouping the compute nodes in the cluster further comprises:

grouping the compute nodes in the cluster based on whether a MAC address and/or hardware physical address is in one of the ARP table and address mapping table.

6. The method of claim 1, wherein the HA operation is a load balancing operation, fault tolerance operation and/or disaster/fault recovery operation.

7. The method of claim 1, wherein obtaining the list of operating, provisioned and/or about to be provisioned compute nodes in the cluster comprises:

obtaining the list of operating, provisioned and/or about to be provisioned compute nodes in the cluster using a user input, an output of a provisioning tool and/or an output of a scaling tool that automatically deploys the compute nodes.

8. The method of claim 1, wherein a minimum RTT is about 10 milliseconds.

9. The method of claim 1, wherein measuring the RTTs, using the ping, between each compute node and each of remaining compute nodes in the list comprises:

measuring the RTTs, using a pre-determined number of pings, between each compute node and each of remaining compute nodes in the list; and obtaining minimum RTTs from the measured RTTs obtained using the predetermined number of pings.

10. The method of claim 1, further comprising:

configuring one or more compute nodes, that are not grouped in the list, as witness compute nodes; and breaking ties or split-brain syndromes in the cluster during operation using the configured witness compute nodes.

11. The method of claim 1, wherein the grouping comprises classifying, tagging, locating, and/or configuring.

12. A system comprising:

a cluster, wherein the cluster comprises one or more sites and each site comprises one or more compute nodes;

a local storage communicatively coupled to the clusters via local area networks; and a virtual infrastructure management (VIM) server coupled to the clusters via a wide area network (WAN) is to:

obtain a list of operating, provisioned and/or about to be provisioned compute nodes in a cluster;

obtain user configured and run-time network parameters of a network interface card (NIC) of each compute node in the list;

measure round-trip times (RTTs), using a ping, between each compute node and each of remaining compute nodes in the list;

group the compute nodes in the list based on the obtained user configured and run-time network parameters and/or the measured RTTs; and perform a high availability (HA) operation in the cluster using the grouped compute nodes.

13. The system of claim 12, wherein the cluster comprises a stretched cluster, a multi-AZ cluster, a metro cluster, or a high availability (HA) cluster that crosses multiple areas within a local area network (LAN) or a wide area network (WAN).

14. The system of claim 12, where in the VIM server further to:

determine presence of any location devices and/or sensors in each compute node in the list; and obtain location related data using the location devices and/or sensors for each compute node in the list, wherein managing the HA in the cluster comprises:

group the compute nodes based on the obtained location related data, the obtained user configured and run-time network parameters, and/or the measured RTTs, and perform the HA availability operation in the cluster using the grouped compute nodes.

15. The system of claim 12, wherein the group comprises classify, tag, locate, and/or configure.

16. The system of claim 12, wherein the user configured and run-time network parameters are internet protocol (IP) routing table, address resolution protocol (ARP) table, net neighbor table, MAC address, hardware physical address, IP address, subnet mask, default gateway, domain name system (DNS) server, host name, NIC port type, port speed and/or mapping tables.

17. The system of claim 12, wherein the VIM server to group the compute nodes in the cluster based on whether a MAC address and/or hardware physical address is in one of the ARP table and address mapping table.

18. The system of claim 12, wherein the VIM server to obtain the list of operating, provisioned and/or about to be provisioned compute nodes in the cluster using a user input, an output of a provisioning tool and/or an output of a scaling tool that automatically deploys the compute nodes.

19. The system of claim 12, wherein the HA operation is a load balancing operation, fault tolerance operation and/or disaster/fault recovery operation.

20. The system of claim 12, wherein the VIM server obtains the list of operating, provisioned and/or about to be provisioned compute nodes in the cluster using a user input, an output of a provisioning tool and/or an output of a scaling tool that automatically deploys the compute nodes.

21. The system of claim 12, wherein the VIM server further to:

measure RTTs, using a pre-determined number of pings, between each compute node and each of remaining compute nodes in the list; and obtain minimum RTTs from the measured RTTs obtained using the predetermined number of pings.

22. The system of claim 12, wherein the VIM server further to:

configure one or more compute nodes, that are not grouped in the list, as witness compute nodes; and break ties or split-brain syndromes in the cluster during operation using the configured witness compute nodes.

23. A non-transitory machine-readable storage medium encoded with instructions that, when executed by a processor, cause the processor to:

obtain a list of operating, provisioned and/or about to be provisioned compute nodes in a cluster;

obtain user configured and run-time network parameters of a network interface card (NIC) of each compute node in the list;

measure round-trip times (RTTs), using a ping, between each compute node and each of remaining compute nodes in the list;

group the compute nodes in the list based on the obtained user configured and run-time network parameters and/or the measured RTTs; and perform a high availability (HA) operation in the cluster using the grouped compute nodes.

24. The non-transitory machine-readable storage medium of claim 23, further comprising instructions to:

determine presence of any location devices and/or sensors in each compute node in the list; and obtain location related data using the location devices and/or sensors for each compute node in the list, wherein managing the HA in the cluster comprises:

group the compute nodes based on the obtained location related data, the obtained user configured and run-time network parameters, and/or the measured RTTs, and perform the HA availability operation in the cluster using the grouped compute nodes.

25. The non-transitory machine-readable storage medium of claim 23, further comprising instructions to:

measure RTTs, using a pre-determined number of pings, between each compute node and each of remaining compute nodes in the list; and obtain minimum RTTs from the measured RTTs obtained using the predetermined number of pings.

26. The non-transitory machine-readable storage medium of claim 23, further comprising instructions to:

configure one or more compute nodes, that are not grouped in the list, as witness compute nodes; and break ties or split-brain syndromes in the cluster during operation using the configured witness compute nodes.

* * * * *